United States Patent Office 3,538,715
Patented Nov. 10, 1970

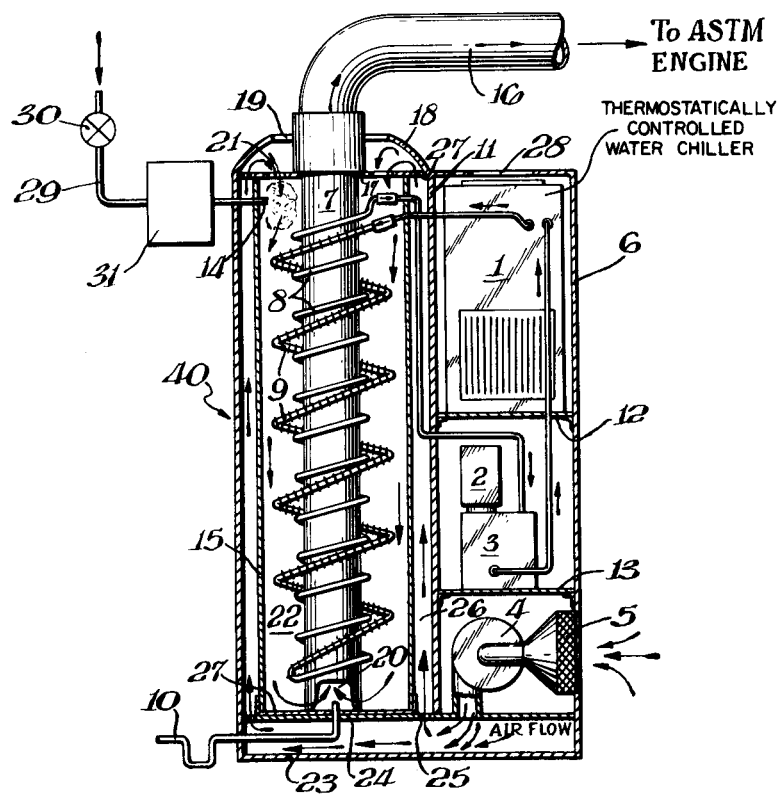

3,538,715
HUMIDITY CONTROLLER
William C. Ludt, Yonkers, and John T. Jones, Ardsley, N.Y., assignors to Ethyl Corporation, New York, N.Y., a corporation of Virginia
Filed Apr. 3, 1968, Ser. No. 718,423
Int. Cl. F25d 17/00
U.S. Cl. 62—177                                6 Claims

ABSTRACT OF THE DISCLOSURE

Humidity of air supplied to intake of octane rating engine is automatically controlled by controller having mechanical refrigeration unit cooling a body of liquid like water to thermostatically controlled 32° F., and having cooling coil in heat exchange relation with the liquid and with an air supply conduit to cool the engine intake air to that temperature. Air filter unit can be connected to supply a substantial excess of filtered air to the space from which air moves into the conduit to assure that intake air is filtered. Also steam supply can be provided in the conduit near its inlet to assure that the incoming air is saturated with moisture when cooled to 32° F. Thermostat can be omitted where body of liquid is water and is so large that continuous running of refrigeration unit will not freeze it completely.

---

The present invention relates to the measurement of gasoline octane ratings and performance numbers by comparing knock intensities the gasolines develop in test engines. Because of the many factors that affect knocking in such engines, the standard procedure for the foregoing measurement calls for the engine's intake air to have a carefully controlled moisture content.

Among the objects of the present invention is the provision of improved equipment that automatically adjusts the humidity of the engine's intake air without requiring much attention. Such equipment is particularly suited for use with automatic testing apparatus such as described in U.S. patent application Ser. No. 205,015 filed June 25, 1962 (now U.S. Pat. 3,383,904 granted May 21, 1968); Ser. No. 377,192 filed June 23, 1964; Ser. No. 617,754 filed Jan. 24, 1967 (now U.S. Pat. 3,485,598 granted Dec. 23, 1969); and Ser. No. 577,560 filed Aug. 9, 1966 (now U.S. Pat. 3,488,168 granted Jan. 6, 1970).

The foregoing as well as additional objects of the present invention will be more fully understood from the following description of several of its exemplifications, reference being made to the accompanying drawing wherein the figure is a vertical sectional view of a humidity controller of the invention.

According to the present invention a humidity controller has a conduit defining a flow path through which engine intake air is passed, a mechanical refrigeration unit having a cooling coil positioned in heat exchange relation with the flow path and also in heat exchange relation with a body of liquid like water, thermostat elements in heat exchange relation with said liquid and connected to control the refrigeration so as to maintain the temperature of the liquid at 32° F., and a liquid trap in the air flow path to keep liquid water from moving to the engine with the intake air, and to remove surplus water without permitting unconditioned air to reach the engine.

The controller can also have a filtered air supply connected to supply filtered air for moving through the flow path. Another very desirable feature is a steam supply near the inlet end of the air flow path and connected to supply enough steam to that air to assure it is saturated with moisture when it is cooled to 32° F.

Turning now to the drawing, the figure illustrates a humidity controller 40 in the form of a cabinet 6 from the top of which emerges air delivery pipe 16 that can be connected to the air intake of a standard octane rating engine such as described in ASTM Manual for Rating Motor Fuels by Motor and Research Methods, 4th edition, 1960. The pipe has a vertical portion 7 extending downwardly into the cabinet and supported by a ring 17. A collar 18 surrounds the pipe 16 where it emerges from the cabinet, the collar being spaced from the pipe to provide an inlet 19 for air. Ring 17 is similarly spaced from the adjacent portions of the cabinet top to open a connection path from inlet 19 to the interior of the cabinet around the pipe. At its lower end the pipe section 7 is cut away, as shown at 20, to permit the air coming in through inlet 19 to enter the pipe.

Pipe section 7 is surrounded by a conduit 15 spaced from it to provide an air passageway 22 guiding the incoming air downwardly around the pipe section. In the space 22 cooling coils 8 and 9 are wound around the pipe section. Coil 9 is finned and wound so that it occupies the center of the annular space 22 formed by pipe section 7 and conduit 15. Coil 8 is wound tightly around pipe section 7 to cool its entire area of contact. These coils are connected in a mechanical refrigeration system that includes a sump 3 for coolant that circulates through the coils, a pump 2 for circulating the coolant and a water chiller 1 containing a body of water and automatic chilling mechanism thermostatically controlled to cool the water to 32° F. and maintain it there. A partition 11 can be inserted in the cabinet to separate the air flow path from the water chiller 1 as well as from the balance of the mechanical refrigeration system.

The water chiller can be of any desired type such as Sunroc Model SP-13, sold by Sunroc Corporation, Glen Riddle, Pa., and is shown as supported on a shelf 12 above the sump 3 and circulating pump 2. The sump and pump are also supported on a shelf 13 below shelf 12. Coolant coil 9 is connected to receive the coolant as it leaves the water chiller and this coil is finned for better heat transfer to the air in passageway 22. Coil 9 extends from near the top to near the bottom of passageway 22. Coil 8 is preferably in good heat exchange contact with pipe section 7, and is accordingly not finned.

Below shelf 13 the cabinet houses an air blower 4 having its intake fitted with a filter 5 and discharging filtered air into a chamber 23 that extends along the bottom of the cabinet. The top of the chamber is defined by a floor 24 on which pipe section 7 can also rest.

Slots in floor 24 establish communication between chamber 23 and an annular plenum 26 that surrounds conduit 15 and extends to the very top of the cabinet where it also communicates through slots 27 with the space inside collar 18.

A liquid trap 10 including a cap 27 is provided at the lower end of conduit 15 to collect and discharge condensate depositing in passageway 22 or in pipe section 7, without opening the interior of the passageway or the pipe to leakage of air in or out. A vent 28 can also be provided as an air inlet or outlet to help dissipate heat developed in the refrigeration system for the water chiller 1.

A steam jet 14 is located just inside the top of conduit 15 and connected to water line 29 which can be valved, as shown at 30. An electric heater 31 in the water line surrounds the water and generates steam for discharge through jet 14.

In use pump 2 circulates coolant which can be water containing a little ethylene glycol or the like to keep it from freezing while water chiller 1 is operating, and in a short while the water in chiller 1 will reach the target temperature of 32° F. The test engine is then supplied with air that passes through inlet 19, slots 21 and passageway 22 where it is cooled to 32° F., and enough moisture is added from the steam jet to make sure that when so cooled the air is saturated with moisture. This saturated air moves up through pipe section 7 to the engine and its temperature can then be adjusted as required for the particular type of octane rating test. Excess moisture is collected and discharged by trap 10.

In climates that are not too dry there is ample humidity in the air under normal conditions so that steam jet 14 is not needed. On the other hand in very dry places such as deserts, the humidity is too low to guarantee that the controller of the present invention will operate satisfactorily without the steam jet. Where it is undesirable to have a water line to supply the water for conversion to steam, as in a desert where water is scarce, water can be supplied by cooling the exhaust of the test engine, and if desired, distilling the water so condensed to separate it from other exhaust components. All this can be automatically arranged so that there will be no need to maintain or monitor a separate source of water.

Air inlet 19 is made large enough, as for example at least two inches in width completely around pipe 7, which in turn should be about six inches in outside diameter, to avoid pressure differentials between the air in passageway 22 and that in the atmosphere surrounding the cabinet. Also such spacing keeps the air supplied by blower 4 from having a pressure-increasing effect on the air intake passageway 22. Blower 4 should have a filtered air output two or more times that required by the test engine to be certain that inlet 19 is thoroughly suffused with filtered air and that essentially only such air is inducted into the test engine. Slots 25 should also be as wide as inlet 19 and the cutaway 20 similarly large enough to avoid a pressure differential as air moves through them. The effective opening area defined by cutaway 20 is diminished some when moisture collects in cap 27 of conduit 15, and this should be taken into account when providing the cutaway and locating the inner end of trap 10. The effective opening area should be about the same as the internal cross-sectional area of pipe 16, and the inner end of trap 10 need only ½ inch above the floor of cap 27. This assures a supply of water in the cap 27 to assist in saturating the incoming air.

Pipe section 7 is desirably made of metal so as to help with the cooling effect of coils 8 and 9, particularly coil 8. Pipe 16 can be made of fairly non-conductive materials such as plastic if desired. Where metal is used it is advisable to have it stainless steel or other corrosion-resistant material. Conduit 15 can also be made of metal or plastic but here plastic is preferred because it helps insulate passageway 22 from the higher temperatures in plenum 26. The construction materials used in the remaining elements of the controller are generally not significant, although it is helpful to surround conduit 15 by thermal insulation such as a one-half inch thick blanket of urethane foam or foamed rubber or the like.

The controller of the present invention can be used for extended periods with very little checking or maintenance. It can also be located in relatively inaccessible installations or geographical areas and its operation readily monitored remotely as by a remotely connected water sensor such as a float in trap 10 and a meter that measures the electric current drawn by the controller. Such an arrangement is particularly suited for pipe line monitoring and control as described in Ser. No. 577,560.

Because of its low maintenance requirements the controller of the present invention is much more desirable than the conventional ice tower even if the tower is equipped with an automatic ice supply. Such an ice supply cannot be depended upon to mechanically deliver ice to an ice tower for anywhere near the periods of time through which the controller of the present invention will operate without supervision.

The use of a liquid coolant in lines 8 and 9 rather than a refrigerant gas, makes it possible to accurately control the temperature of the incoming air. The temperature of a coil containing refrigerant gas will be subject to considerable variation depending upon atmospheric temperature, the pressure in the coil, heat losses, etc., and cannot be relied on for the required control.

The humidity controller of the present invention can be modified by using a body of water in place of the mechanical 32° F. thermostat. By appropriate selection of the mass of water, the heat absorption capacity of the refrigeration, and heat flow to the water from its surroundings, thermostatic action will be supplied without the mechanical thermostat. The heat absorption capacity is made insufficient to freeze the entire body of water solid, although more than adequate to cool all the water and all the engine air to 32° F. Inasmuch as the amount of heat abstraction needed to freeze all the water solid is generally about three or more times as much as needed to cool the water to 32° F. from ambient temperatures, it is a simple matter to select a heat absorption rate that will cool the water to 32° F. in about thirty minutes of operation after the heat absorption starts, yet with continuous running will not be able to cool the water below that temperature. It generally takes about thirty minutes of operation for a test engine to warm up and reach satisfactory testing condition, and in that period the humidity controller of the present invention will also come to testing condition.

In the above-modified construction the heat absorption unit can be arranged to run continuously so that no on-off switching is needed. The elimination of such switching along with the elimination of the thermostat makes the controller even more dependable for unsupervised operation. The body of water should however be safeguarded against leaking out, and against excessive evaporation as for example during periods of prolonged non-use, as by being hermetically sealed in a plastic compartment having yieldable walls not damaged by expansion due to freezing of the water.

Obviously many modifications and variations of the present invention are possible in the light of the above teachings. It is, therefore, to be understood that within the scope of the appended claims the invention may be practiced otherwise than as specifically described.

What is claimed:

1. An engine intake humidity controller having a conduit defining a flow path through which engine intake air is passed, a mechanical refrigeration unit having a cooling coil positioned in heat exchange relation with the flow path and containing liquid coolant, thermostat means connected to control the refrigeration so as to maintain the temperature of the liquid coolant at 32° F., and a liquid trap in the air flow path to keep liquid water from moving to the engine with the intake air, the thermostat means being a body of water of such magnitude as to be partly but not fully frozen by the mechanical refrigeration unit operating continuously.

2. An engine intake humidity controller having a conduit defining a flow path through which engine intake air is passed, a mechanical refrigeration unit having a cooling coil positioned in heat exchange relation with the flow path and containing liquid coolant, thermostat means connected to control the refrigeration so as to maintain the temperature of the liquid coolant at 32° F., a liquid trap in the air flow path to keep liquid water from moving to the engine with the intake air, and a filtered air supply having an output greater than the engine intake and with a filtered air discharge adjacent the flow path intake to supply filtered air for moving through the flow path, both the discharge and the intake being open to ambient air.

3. An engine intake humidity controller having a conduit defining a flow path through which engine intake air is passed, a mechanical refrigeration unit having a cooling coil positioned in heat exchange relation with the flow path and containing liquid coolant, thermostat means connected to control the refrigeration so as to maintain the temperature of the liquid coolant at 32° F., a liquid trap in the air flow path to keep liquid water from moving to the engine with the intake air, and a steam supply near the inlet end of the air flow path and connected to supply enough steam to that air to assure that it is saturated with moisture when cooled to 32° F.

4. An engine intake humidity controller having a conduit defining a flow path through which engine intake air is passed, a mechanical refrigeration unit having a cooling coil positioned in heat exchange relation with the flow path and containing liquid coolant, thermostat means connected to control the refrigeration so as to maintain the temperature of the liquid coolant at 32° F., a liquid trap in the air flow path to keep liquid water from moving to the engine with the intake air, the conduit extending generally vertically, a discharge pipe is within the conduit and spaced from its walls, the cooling coil is positioned within the conduit and around the discharge pipe, and the air flow path is downward around the discharge pipe followed by upward within the discharge pipe.

5. The combination of claim 4 in which the controller also has an air filter supply connected to deliver to the space above the upper end of the conduit a substantial excess of filtered air.

6. An engine intake humidity controller having an upwardly directed conduit defining a flow path through which engine intake air is passed, a mechanical refrigeration unit having a cooling coil positioned in heat exchange relation with the flow path and containing liquid coolant, thermostat means connected to control the refrigeration so as to maintain the temperature of the liquid coolant at 32° F., and a liquid trap in the lower portion of said conduit shaped to hold liquid water in the flow path over substantially the entire cross-section of the conduit while keeping such water from moving to the engine with the intake air, and an air discharge conduit opening just above the body of water to cause the incoming air to impinge on the body of water as it moves to the engine.

References Cited
UNITED STATES PATENTS

| | | | |
|---|---|---|---|
| 2,224,629 | 10/1940 | Borse | 62—333 |
| 2,187,470 | 1/1940 | Collins | 62—283 |
| 2,375,069 | 5/1945 | Bennett | 62—317 |
| 2,477,772 | 8/1949 | Simpson | 62—93 |

MEYER PERLIN, Primary Examiner

U.S. Cl. X.R.

62—406